United States Patent [19]

Siegwart

[11] Patent Number: 4,598,819
[45] Date of Patent: Jul. 8, 1986

[54] BELT CONVEYOR STRUCTURE

[75] Inventor: Wolfgang Siegwart, Sulzbach, Fed. Rep. of Germany

[73] Assignee: Sipavag AG, Switzerland

[21] Appl. No.: 580,707

[22] Filed: Feb. 16, 1984

[30] Foreign Application Priority Data

Mar. 3, 1983 [CH] Switzerland ............ 1163/83

[51] Int. Cl.⁴ .................................. B65G 21/14
[52] U.S. Cl. .................... 198/861.1; 198/842
[58] Field of Search ............. 198/860, 862, 804, 842, 198/816, 780, 841, 835, 861.1

[56] References Cited

U.S. PATENT DOCUMENTS

| | | | |
|---|---|---|---|
| 2,017,156 | 10/1935 | Mattler | 198/835 |
| 2,529,684 | 11/1950 | Gass | 198/842 |
| 3,329,253 | 7/1967 | Tashman | 198/842 X |
| 3,332,538 | 7/1967 | Rice | 198/816 |
| 3,605,994 | 9/1971 | Parlette | 198/860 |
| 3,944,055 | 3/1976 | Stumpf | 198/780 |

FOREIGN PATENT DOCUMENTS

| | | | |
|---|---|---|---|
| 2243582 | 3/1974 | Fed. Rep. of Germany | 198/842 |
| 620913 | 3/1949 | United Kingdom | 198/842 |

*Primary Examiner*—Joseph E. Valenza
*Assistant Examiner*—D. Glenn Dayoan
*Attorney, Agent, or Firm*—McGlew and Tuttle

[57] ABSTRACT

A supporting frame of a conveyor, over the top side of which the upper section of an endless conveyor belt is trained, comprises two identical symmetrically arranged angle sections. The upper legs of the angle sections are firmly connected to each other by an intermediate plate of any width. The lateral legs of the angular sections support at each end of the frame a pair of journal pins on which end sleeves are mounted for rotation. The two identical end sleeves are firmly connected to each other through a roller sleeve having a length corresponding to the spacing of the sleeves. By choosing the connecting members which are simple to adapt, namely the intermediate plate and the roller tubes, series manufactured stock elements, namely the longitudinal members of the frame and the end sleeves of the guide rollers, can be used for conveyors of various widths.

4 Claims, 7 Drawing Figures

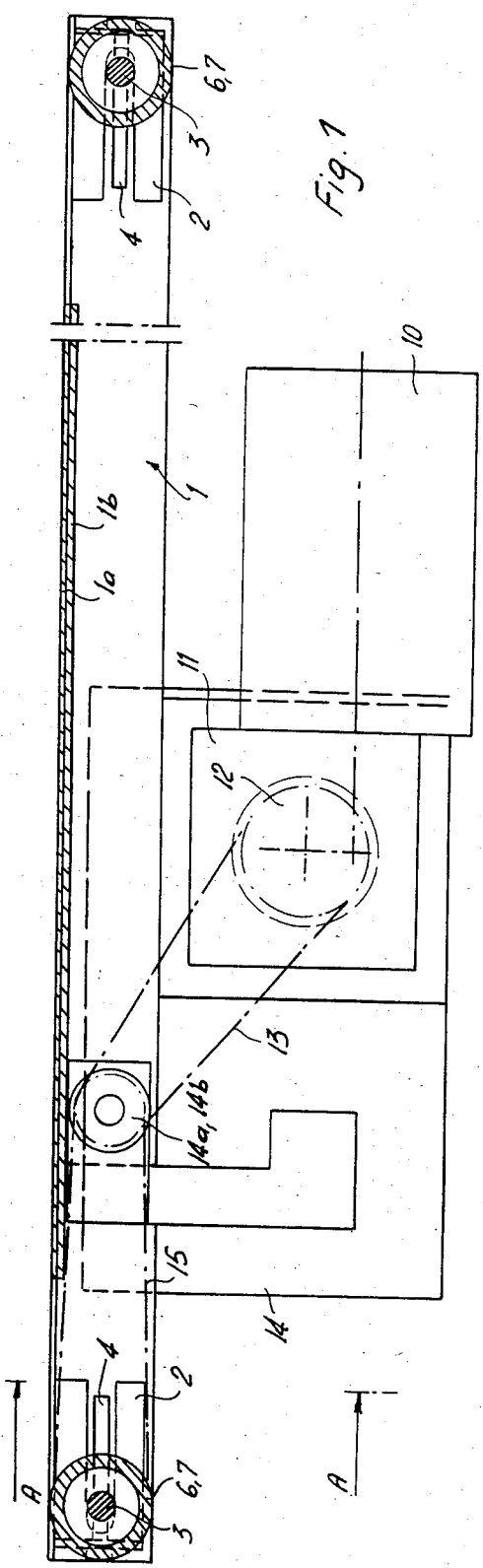
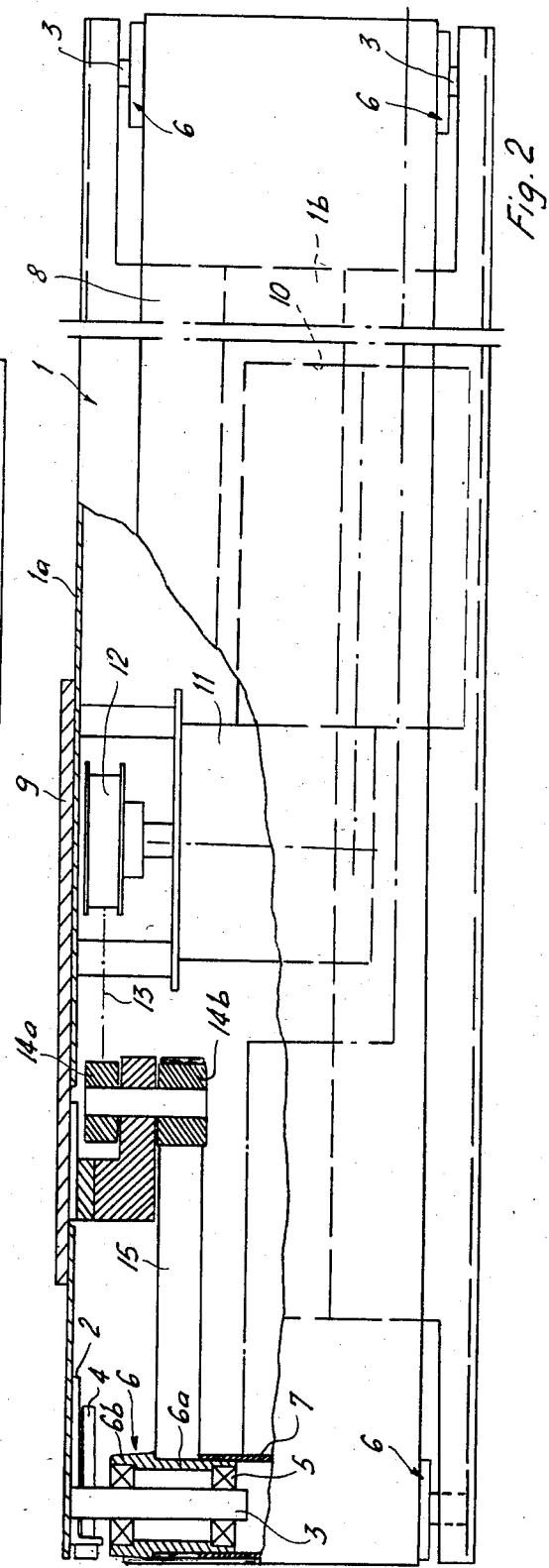
Fig. 1
Fig. 2

BELT CONVEYOR STRUCTURE

FIELD AND BACKGROUND OF THE INVENTION

The invention relates in general to conveyors and in particular to a new and useful belt conveyor structure in which the conveyor belt is trained about at least two guide rollers mounted on a supporting frame.

Belt conveyors of this kind, which are employed in many industrial activities for conveying workpieces or products, mostly comprise a supporting frame having a width corresponding to that of the belt which is used. At the two ends of the frame, axially parallel guide rollers are mounted, and between the rollers, the longitudinal members of the frame are firmly connected to each other by a cover plate backing up the upper section of the endless belt. Cover plate and longitudinal members of the frame are mostly made of a single metal sheet. The guide rollers are usually embodied by cylindrical tubes having slightly tapering outer end portions and being mounted on the lateral members of the frame through roller bearings carried on shafts which extend over the entire width of the conveyor, for example. The belt may be driven through one of the two guide rollers or through a separate drive roller cooperating with the lower belt section, and an electric motor, which drive elements are supported on the frame.

Depending on the application, not only the length of the conveyor determining the spacing apart of the guide rollers, but also the width of the belt, and of the frame, thus the length of the guide rollers, vary. Therefore, up to the present time, the individual elements of the conveyor could be manufactured and assembled only after being sure about the desired dimensions, so that a conveyor was custom-made. A standardization in widths of the frames and belts could not change much, since for obvious reasons, the gradation of sizes with steps such as from 5 cm to 50 cm is limited, and storing of an assortment of supporting frames and guide rollers requires more than average space.

The present invention is directed to a conveyor frame structure which can be assembled of a few individual parts whose size is entirely independent of the desired width and which, therefore, does not create storage problems, with only a small number of elements which are simple to work into an adaptation of the desired size.

In accordance with the invention a belt conveyor structure comprises a pair of spaced apart longitudinally extending side members and an intermediate transverse member of a selected width or an adjustable width extending between and connected to the side members so as to form a supporting frame. A holding angle is connected to each side member and each carries a journal pin which provides a mounting for bearings for a rotatable sleeve so that the sleeve of the respective side members extend in opposed aligned relationship. A roller tube is located between the rollers and extends over a portion of each and an endless belt is trained around the roller tube and around one or more other roller tubes similarly mounted in the frame.

The longitudinal members and sleeves and journal pins are identical with each other and are in no way dependent on the respective width of the structure or belt. They can be manufactured in large series and conveniently stored. Both the intermediate member, preferably a plate, for connecting the longitudinal members, and the roller tube connected to the end sleeves of the guide rollers are simple elements easily adapted to size. This also applies to sizing the longitudinal members and the connecting elements. No problems arise with the assemblage (for example by welding, screwing, clamping, gluing, etc.). Aside therefrom, an option is given for the first time to indicate virtually accurately any suitable length and width of the structure without regard to the series manufacture and storage of the substantial parts.

Accordingly it is an object of the present invention to provide an improved conveyor support structure which includes side members which form a frame together with cross members of selected length and which includes roller bearing supports on each side member for a rotatable sleeve, and wherein the sleeve of the opposite side members are aligned laterally and are partially covered by a roller tube positioned therebetween.

A further object of the invention is to provide a conveyor structure which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a vertical longitudinal sectional view of a belt conveyor structure constructed in accordance with the invention;

FIG. 2 is top plan view corresponding to FIG. 1 with a portion in horizontal section;

DESCRIPTION OF THE PREFERRED EMBODIMENTS

Figure 3:
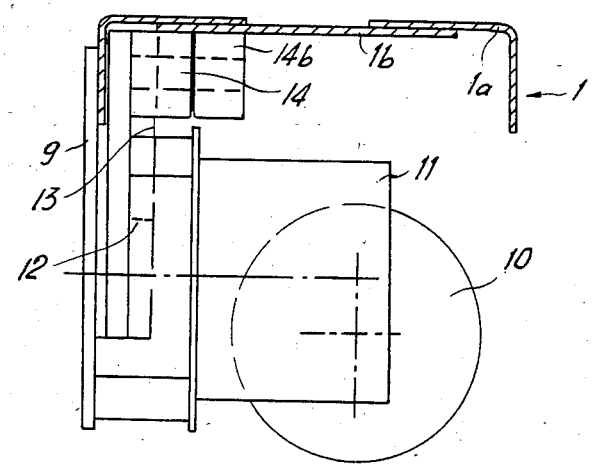
FIG. 3 is a vertical cross section taken along the line A—A of FIG. 1.
Figure 4:
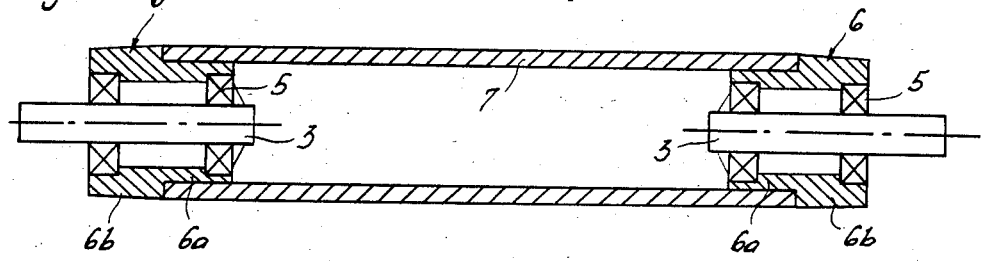
FIG. 4 is an enlarged view of the guide roller.

Referring to the drawings in particular, the invention embodied therein comprises a belt conveyor structure which comprises a conveyor frame generally designated 1 formed by a pair of spaced apart longitudinally extending side members or angle sections 1a and an intermediate transverse member 1b which is of selected or variable width which extends between and is connected to the adjacent respective ends of the side members. A holding angle 2 is connected to each end of the associated side member and it carries a journal pin 3 for rotatable ball bearings 5 on which is mounted a sleeve 6. The sleeves of opposite longitudinal members are aligned at corresponding ones of the opposite member and they provide a rotatable support for a roller tube which extends therebetween and covers a portion of each.

As shown in the drawings, the belt conveyor structure comprises supporting frame 1 which is assembled to the two identical and symmetrically arranged angle sections 1a and intermediate plate 1b connecting the upper or inner legs of the angle sections together. Holding angles 2 having a longitudinal slot are secured to the end portions of the downwardly extending legs of angle sections 1a. The longitudinal slots of angles 2 are intended to guide journal pins 3 which are displaceable and fixable in position therein by means of a screw 4 which is engaged in a tapped hole of the respective journal pin 3 and bears against the front leg of angle 2. On each of journal pins 3, an end sleeve 6 is mounted through ball bearings 5. End sleeves 6 are identical in design and mounted symmetrically in pairs at opposite locations. On offset portions 6a of associated end sleeves 6, a roller tube 7 is fitted and secured against rotation thereon. The adjacent, aligned external portion 6b of each end sleeve 6 slightly tapers radially inwardly in a laterally outward direction.

It will be understood from the foregoing that any length and width of a supporting frame 1 forming the basic structure of the conveyor can be obtained by correspondingly cutting or sizing angle sections 1a and intermediate plate 1b and roller tubes 7. The same angle sections 1a, journal pins 3, and end sleeves 6 are employable for any width.

A conveyor belt 8 is trained about guide rollers 6 and 7 and has an upper section extending over the upper side of the supporting frame formed by the upper legs of the angle sections 1a and the intermediate plate 1b and the belt may be driven in various ways. For example, the belt may be trained below supporting frame 1 around further rollers of which one is drivable by an electric motor, or one of the two guide rollers supported on the end portions of the frame may be driven, as shown in the present example. The drive unit in the shown embodiment is mounted on a side plate 9 which is secured, for example screwed, to one of angle sections 1a. Mounted on side plate 9 is an electric motor 10 and a corresponding transmission 11 whose output shaft carries a pulley 12. Pulley 12 is connected by a belt 13 to a roller 14a which in turn is drivably connected through another pulley 14b mounted on the same shaft supported by a bracket 14, and a belt 15 to one of the two guide rollers 6,7. As shown, drive belt 13 extends laterally of conveyor belt 8, and drive belt 15 extends between the upper and lower sections of conveyor belt 8 to the cylindrical portion 6a of the respective end sleeve 6 of guide roller 7. Roller tube 7 of this guide roller is adequately shorter and conveyor belt 8 overlies both the roller tube and the drive belt and, at the side, partly also the tapering portion 6b of end sleeve 6.

Figure 5:
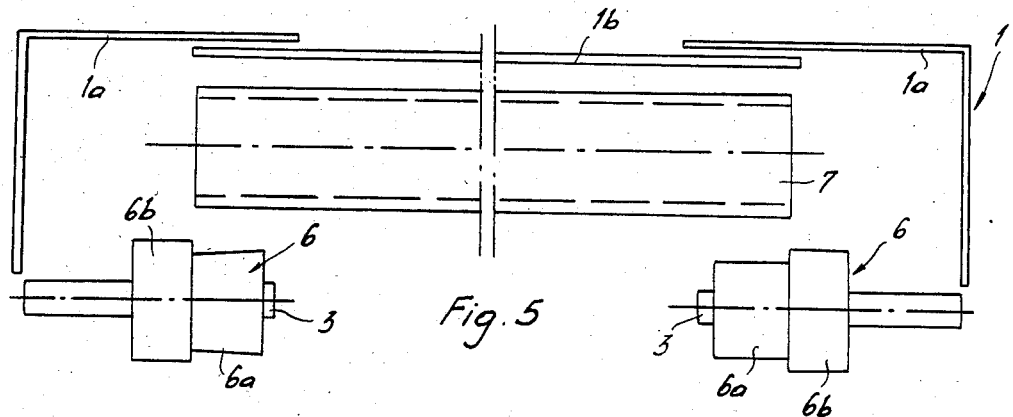
FIG. 5 is an exploded front view showing the conveyor elements in non-assembled state.
Figure 6:
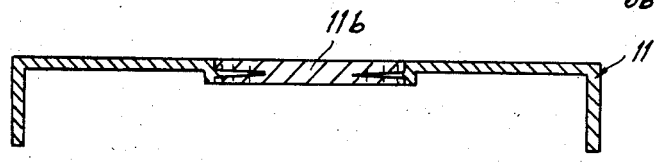
FIGS. 6 and 7 are sectional views showing different embodiments fo the supporting frame.
Figure 7:
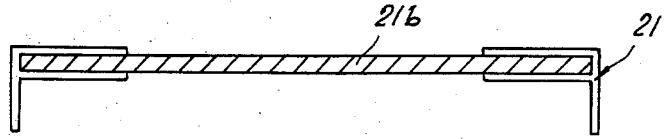

As shown diagrammatically in FIG. 5, the elements to be assembled into a belt conveyor structure, namely the angle sections 1a of frame 1 and the end sleeves 6 mounted on journal pins 3 through bearings 5, do not depend on the width of the finished structure. They may be manufactured in large series and stored in great numbers. Depending on the conveyor widths wanted by the customer, they may rapidly and simply be assembled of correspondingly dimensioned intermediate plates 1b and roller tubes 7. As shown in FIGS. 6 and 7 intermediate plate 11b, 21b and longitudinal member 11 and 21 of the supporting frame may also be designed otherwise than according to FIG. 5. In any case, however, the width of the finished frame depends only on the width of the intermediate plate. For example, according to FIG. 6, the upper legs of longitudinal member 11 may have their edge provided with spikes which are to be driven into an intermediate plate 11b made of a suitable material. According to FIG. 7, the upper leg of longitudinal member 21 is provided with a lengthwise groove into which intermediate plate 21b is engaged.

It will be understood that all the additional elements, such as holding angles 2, the drive unit, etc. are also independent of the width of the finished frame structure. The intermediate plate (which might be a grate or a perforated plate) may also be connected to the longitudinal members by gluing or welding, while the roller tubes of the guide rollers may be firmly connected to the sleeves by press-fitting them onto serrations of the cylindrical portions.

While specific embodiments of the invention have been shown, and described in detail to illustrate the application of the principles of the invention, it will be understood that the invention may be embodied otherwise without departing from such principles.

What is claimed is:

1. An adjustable width belt conveyor structure comprising: a pair of identical longitudinally extending angle members, each having a first leg forming a top surface and a second leg forming a side surface; an intermediate transverse member of selected width connected fixedly between said first legs of respective said angle members so as to position one of said angle members in spaced apart substantially parallel relationship with the other said angle member; a journal pin connected to said second leg of each of said angle members, said pins being axially aligned with one another and extending between said second legs; a sleeve rotatably supported on each one of said journal pins, said sleeves being identical and being disposed in spaced aligned relationship between said second legs; a roller tube of selected width detachably mounted between and engaged coaxially over said sleeves; each of said sleeves having a cylindrical portion extending at least partly and being fixed to said roller tube, each of said sleeves having an axially outer portion extending axially outwardly of said roller tube, said cylindrical portion of each sleeve extending radially inwardly of said outer portion of each sleeve, said outer portion of each sleeve tapering slightly axially outwardly of said roller tube; a conveyor belt of selected width trained over said roller tube; drive means; and, a drive belt associated with said main drive means being engaged over said cylindrical portion of one of said sleeves wherein, the width of the conveyor belt structure may be adjusted by changing the width of the intermediate transverse member selected, the width of the roller tube selected and the width of the conveyor belt selected.

2. An adjustable width belt conveyor structure according to claim 1, further comprising: a side plate connected to said second leg of one of said members; wherein said drive means includes a drive unit connected to said side plate.

3. A belt conveyor structure according to claim 2, wherein said drive belt is engaged on said cylindrical portion of said one sleeve next to said roller tube on said one sleeve, said conveyor belt being trained over said drive belt, said conveyor belt also being trained over at least a part of said outer portion of each sleeve.

4. A belt conveyor structure according to claim 3, wherein said drive unit comprises a drive motor connected to said side plate, a pulley connected to said drive motor for rotation, a pulley bracket connected to said angle member to which said side plate is connected, a double pulley rotatably mounted to said pulley bracket, a further drive belt trained around said pulley which is connected to said motor and one pulley of said double pulley, said first-mentioned drive belt being connected to a second pulley of said double pulley, said second drive belt being disposed axially outwardly of said conveyor belt and between said second legs of said angle members.

* * * * *